United States Patent [19]

Fürsich et al.

[11] Patent Number: 4,589,766
[45] Date of Patent: May 20, 1986

[54] COPYING METHOD AND ARRANGEMENT FOR COLORED ORIGINALS

[75] Inventors: Manfred Fürsich, Taufkirchen; Günter Findeis, Sauerlach; Helmut Treiber, Munich; Berthold Fergg, Taufkirchen; Siegfried Thurm, Meerbusch, all of Fed. Rep. of Germany

[73] Assignee: Agfa-Gevaert Aktiengesellschaft, Leverkusen, Fed. Rep. of Germany

[21] Appl. No.: 778,156

[22] Filed: Sep. 16, 1985

Related U.S. Application Data

[63] Continuation of Ser. No. 610,402, May 15, 1984, abandoned.

[30] Foreign Application Priority Data

May 17, 1983 [DE] Fed. Rep. of Germany ....... 3317804

[51] Int. Cl.⁴ ............................................. G05B 27/78
[52] U.S. Cl. ......................................... 355/38; 355/68; 355/77; 356/404
[58] Field of Search ............................ 355/38, 77, 68; 356/404

[56] References Cited

U.S. PATENT DOCUMENTS

| 3,554,642 | 1/1971 | Zahn | 355/38 |
| 3,724,947 | 4/1973 | Paulus | 355/38 |
| 3,797,941 | 3/1974 | Staes et al. | 356/404 |
| 3,888,580 | 6/1975 | Amano et al. | 355/38 |
| 4,101,217 | 7/1978 | Fergg et al. | 355/38 |
| 4,279,502 | 7/1981 | Thurm et al. | 355/38 |

FOREIGN PATENT DOCUMENTS 2118617 4/1971 Fed. Rep. of Germany.

OTHER PUBLICATIONS

The Reproduction of Color by R. W. G. Hunt, 1967, Fountain Press, London W.C. 2.

Primary Examiner—L. T. Hix
Assistant Examiner—Della Rutledge
Attorney, Agent, or Firm—Peter K. Kontler

[57] ABSTRACT

A strip of exposed and developed color film is transported through a transparency measuring system. The transparency of each frame of the film strip in the three primary colors is measured at a multiplicity of regions. The transparency values are converted to density values which are processed to generate a set of data characteristic of the film strip and indicative of the color compositions of the scanned regions. The characteristic set of data and the density values for the individual regions are used to determine whether or not a respective region contains a color dominant. For each frame, the amounts of copying light in the primary colors are established from the density values of those regions which are free of color dominants and have a neutral gray color composition. The amount of copying light in each of the three primary colors is calculated so that the regions of the original having a neutral gray color composition are copied neutral gray. In order to ensure that the copying material registers the copying light in the same manner as the measuring system registers the transparency measuring light, the measuring light is filtered so as to match the spectral sensitivity of the measuring system in each primary color to the spectral sensitivity of the copying material in the same color.

17 Claims, 7 Drawing Figures

COPYING METHOD AND ARRANGEMENT FOR COLORED ORIGINALS

This application is a continuation of application Ser. No. 610,402, filed May 15, 1984 now abandoned.

BACKGROUND OF THE INVENTION

The invention relates generally to a method of and an arrangement for copying colored originals.

More particularly, the invention relates to a method of and an arrangement for determining the amount of light required in each of the primary colors during copying of colored originals, especially frames of color film.

In a known procedure for determining the amount of light required in each of the primary colors during copying of a colored original, the transparency of the original in each of the primary colors is measured prior to copying. The measuring system employed for this purpose is designed in such a manner that the spectral sensitivity or response thereof in each color is identical to that of the copying material, that is, the material onto which the original is copied.

The requirement that the spectral sensitivities of the measuring system and the copying material be identical has been known for a relatively long time. See, for example, the West German Offenlegungsschrift No. 21 18 617. This requirement is based on the fact that a density increase in a color of the original or negative will not lead to a corresponding change in the amount of copying light if the spectral sensitivities of the measuring system and the copying material are different. Such color may then be improperly reproduced. The literature, however, indicates that it is very difficult to match the sensitivities of the measuring system and the copying material. See, for instance, page 284 of the publication by R. W. G. Hunt entitled "The Reproduction of Colour". The reason is that the applicable curves of transmissivity versus wavelength have very steep sides in the long wavelength region. An Example in the Hunt publication illustrates that too low a value for the color density of an original or negative is obtained when the measurement is performed somewhat away from the density maximum. The result is an undercorrection.

The concept of undercorrection and the associated concept of overcorrection are based upon calibration of a copier using a calibrating original or negative constituted by a specific type of film. The copier is calibrated by determining the amounts of light in the primary colors which yield an optimum copy of the calibrating original. When another original or negative constituted by the same type of film as the calibrating original is to be copied, the differences in the color densities of the originals are established. The amounts of copying light required to properly reproduce the second original are then determined by appropriate percentage changes in the amounts of copying light required for the calibrating original.

In order to calculate the amounts of light required to copy an original, the calibration values for the type of film constituting the original must be fed into the copier. The introduction of the calibration values into the copier creates certain problems in film processing plants. On the one hand, if the calibration values are to be supplied to the copier automatically, a great deal of organizational work is required during the preparation of orders. On the other hand, if the calibration values for a film are to be fed into the copier manually when the film enters the copier, a substantial amount of labor must be expended to supply the calibration values to the copier.

The calibration values for different types of film are generally different mainly because the color densities of the film and the densities of the masks used in manufacturing the film may vary from one manufacturer to another.

Another color copying procedure involves neutral gray compensation. This procedure does not require calibration values. Instead, the color densities of an original or negative are measured and, based on these measurements, the amounts of copying light are regulated to obtain a copy which, on average, has a neutral gray color composition. However, automatic regulation of the copying light when using the neutral gray principle leads to a color shift in the copy if the original has so-called color dominants, that is, intensively colored areas stemming from the motif of the image to be copied. Since such a color shift does not occur when a color predominates due to masking of the film or the presence of a color tone, employment of the neutral gray principle raises the problem of distinguishing between color dominants and excessive color induced by masking of the film or the presence of color tones.

OBJECTS AND SUMMARY OF THE INVENTION

It is an object of the invention to provide a color copying method which does not require the input of characteristic values for the type of photosensitive material being processed.

Another object of the invention is to provide a color copying method which reduces the likelihood of color falsification when color dominants are present.

An additional object of the invention is to provide a color copying method which enables the spectral sensitivities of a measuring system for the originals to be matched to the spectral sensitivities of the copying material with a relatively high degree of accuracy.

A further object of the invention is to provide a color copying method which reduces the likelihood of color falsification without requiring the input of characteristic values for the type of photosensitive material being processed.

It is also an object of the invention to provide a color copying arrangement which makes it unnecessary to supply characteristic values for the type of photosensitive material being processed.

Yet another object of the invention is to provide a color copying arrangement which reduces the likelihood of color falsification when color dominants are present.

Still a further object of the invention is to provide a color copying arrangement which enables the spectral sensitivities of a measuring system for the originals to be matched to the spectral sensitivities of the copying material with a relatively high degree of accuracy.

An additional object of the invention is to provide a color copying arrangement which reduces the likelihood of color falsification without requiring the input of characteristic values for the type of photosensitive material being processed.

The preceding objects, as well as others which will become apparent as the description proceeds, are achieved by the invention.

One aspect of the invention resides in a method of copying colored originals constituting part of the same photosensitive article. The method comprises the following steps:

(a) Measuring a property, e.g. the transparency, of the article in each of the primary colors at a multiplicity of regions characteristic of the portion of the article having the originals. The measuring step is carried out in such a manner that each of the originals contains at least some of these regions. The measuring step is performed by directing measuring light in each primary color along a respective measuring path to a measuring device for the color.

(b) Processing the measurements generated during the measuring step to obtain a set of data characteristic of the aforesaid portion of the article and indicative of the color compositions of the measured regions.

(c) Calculating the amount of copying light required in each primary color to achieve at least approximately neutral gray copies of those regions of each original having an at least approximately neutral gray color composition. The calculating step is performed using the set of data in conjunction with the measurements obtained for the respective originals.

(d) Copying the originals onto copying material using the amounts of copying light derived from the calculating step. In accordance with one feature of the invention, the measuring step includes filtering the measuring light in each primary color upstream of the corresponding measuring device to thereby adjust the spectral sensitivity of each measuring device so as to at least approximate the spectral sensitivity of the copying material in the respective color.

Another aspect of the invention resides in an arrangement for copying colored originals constituting part of the same photosensitive article. The arrangement comprises the following:

(a) Measuring means for measuring a property, e.g. the transparency, of the photosensitive article in each of the primary colors at a multiplicity of regions characteristic of the portion of the article having the originals. The measuring means includes at least one measuring device, e.g. a photoelectric transducer, for each color designed to generate measurements of the property in the respective color.

(b) Processing means arranged to receive the measurements and to generate a set of data characteristic of the aforesaid portion of the article and indicative of the color compositions of the measured regions. The processing means is also designed to operate on the measurements and the set of data so as to derive the amount of copying light required in each primary color to achieve at least approximately neutral gray copies of those regions of each original having an at least approximately neutral gray color composition.

(c) Copying means responsive to the processing means and designed to copy the originals onto copying material using the amounts of copying light calculated by the processing means. According to one feature of the invention, the measuring means includes filter means for each of the measuring devices designed to adjust the spectral sensitivity of the respective measuring device so as to at least approximate the spectral sensitivity of the copying material in the corresponding color. Each of the filter means comprises at least one interchangeable filter. In a preferred embodiment of the arrangement, guide means are provided to slidably receive the filters.

The method and arrangement of the invention are particularly well-suited for copying frames of the same strip of color film.

In the method of the invention, the type of photosensitive material or film being processed is of no consequence. A plurality of originals of the same film are measured to develop parameters which are specific to this film and clearly identify those regions of each original having an essentially neutral gray color composition. The optimum amounts of copying light are calculated using the measurements from those regions which were determined to be neutral in color.

A procedure for differentiating between color dominants and color tones is disclosed in the West German Offenlegungsschrift No. 25 35 034. A procedure for distinguishing between color dominants and color tones is also described in the commonly-owned U.S. patent application Ser. No. 610,399 of Manfred Fursich et al. filed May 15, 1984 and entitled Color Copying Method.

Furthermore, in the method of the invention, the light used for measurement of the originals is filtered to adjust the spectral sensitivities of the measuring devices. The filters employed for this purpose may have spectral transmissivities which are selected in such a manner that the measuring light is modified in a sense causing the spectral sensitivities of the measuring devices to match the spectral sensitivities of the copying material in the respective colors. This makes it possible to ensure that the measuring devices and the copying material sense the transmissivities of the original in the respective colors identically. By filtering the measuring light so as to equalize the spectral sensitivities of the measuring devices and the copying material and, in addition, selecting the amounts of copying light so that regions of an original having a neutral gray color composition yield neutral gray copies, the exposure may be readily controlled so as to obtain properly colored copies. This may be accomplished regardless of whether or not color dominants are present and independently of the type of dye or density of the masks used in making the film. Moreover, it is not necessary to feed the type of film and characteristic values for the latter into the copier.

When measurement and copying of an original are performed using different optical systems or light paths, the transmissivities of the filters are advantageously selected taking into account differences in the spectra of the light sources used for copying and measurement. It is further of advantage for the transmissivities of the filters to be selected taking into account spectral differences in the transmissivities of the optical systems employed for the measuring and copying operations. This makes it possible to ensure that the measuring devices and the copying material receive the light emanating from the original or negative under identical conditions even though the measuring and copying operations are performed at different locations with temporary storage of data between these operations.

The novel features which are considered as characteristic of the invention are set forth in the appended claims. The improved color copying arrangement itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
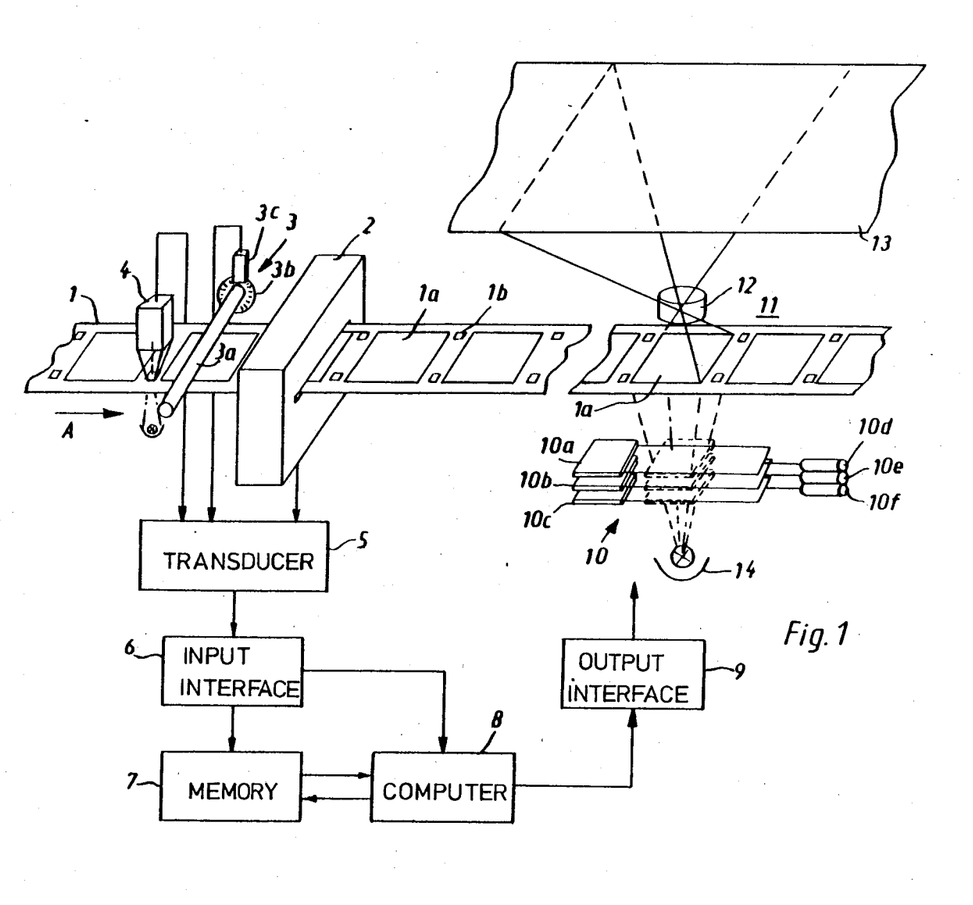
FIG. 1 illustrates a color copying arrangement according to the invention.
Figure 4:
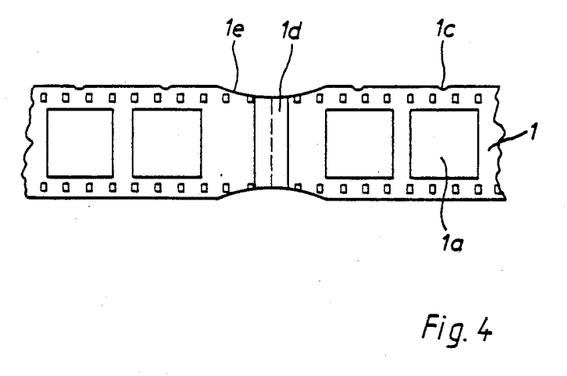
FIG. 4 illustrates portions of two connected film strips as well as the junction between the strips.

Referring to FIG. 1, the reference numeral 1 identifies a length of photosensitive material or film having a series of originals or negatives 1a. The film 1 further has a series of detectable marks 1b which are correlated with and identify the positions of the negatives 1a. The marks 1b may, for example, be apertures which are aligned with the negatives 1a as is the case for 126 and 110 size film. As shown in FIG. 4, the marks may also be notches 1c which are disposed at the edges of the film 1. For 135 size film, such notches 1c are formed at the edges in correlation with the negatives 1a after the film has been exposed and developed. The film 1 is here assumed to be an exposed and developed film.

The direction of travel of the film 1 is indicated by the arrow A. A sensing device 4, e.g. in the form of a light barrier, is located along the path A of the film 1 and detects the marks 1b as they pass by. The sensing device 4 emits a signal upon detection of a mark 1b and such signal is forwarded to a transducer 5.

A length detector 3 is disposed adjacent to the path A of the film 1 downstream of the sensing device 4. The length detector 3 includes a roller 3a which is caused to rotate by the film 1. A disc 3b is mounted on the roller 3a and is provided with a series of uniformly spaced, radial slits near its periphery. The disc 3b is arranged to rotate through a light barrier 3c which generates pulses in response to detection of the slits. The pulses are indicative of the length of film traveling by the length detector 3. The light barrier 3c is connected with the transducer 5 so that the latter receives the signals generated by the light barrier 3c.

Downstream of the length detector 3 as considered in the direction of travel A of the film 1 is a transparency or light measuring system 2. The transparency measuring system 2 has three rows of photoreceivers, e.g. phototransistors or photodiodes, which extend across the width of the film 1. Each row may contain ten photoreceivers which respectively scan one-tenth of the width of the film 1. Each photoreceiver is sensitized for one of the primary colors and the photoreceivers are arranged in such a manner that any region or point of the film 1 subjected to a measurement is scanned in each of the three primary colors. The photoreceivers are designed to emit signals representative of the transparency of the film 1 in the respective colors. In order to ensure that each point or region of the film 1 which is subjected to a measurement is scanned in each of the three primary colors, the three rows of photoreceivers may be located closely behind one another as considered in the direction of travel A of the film 1. It is also possible for the three rows of photoreceivers to be remote from one another and to direct the light which has passed through a region of the film 1 to be measured to the respective rows of photoreceivers via filters and/or partially light-transmissive reflectors.

The transparency measuring system 2 is connected with the transducer 5 so that the three transparency signals, i.e. one signal per color, for each measured region of the film 1 are delivered to the transducer 5. The transducer 5 converts the transparency signals into density values. The length detector 3 coordinates the movement of the film 1 and the operation of the measuring system 2 in such a manner that an original 1a of specific size is scanned in its entirety by the performance of a specific number of measuring procedures. For instance, the length detector 3 may coordinate movement of the film 1 and operation of the measuring system 2 so that an original 1a of small size is entirely scanned by the performance of 14 measuring procedures. During each measuring procedure, 30 signals are generated by the measuring system 2, namely, ten in each color. The sensing device 4 functions to correlate the measurements made by the measuring system 2 with the originals 1a on which the measurements were performed.

An input interface 6 is connected with and arranged to receive the density values calculated by the transducer 5. The input interface 6 transmits these density values to a computer 8 as well as a memory 7. The computer 8 and memory 7 are connected with one another. The computer 8 retrieves from the memory 7 those data required for the individual steps of the calculation to be described below. By way of example, the computer 8 may be a microprocessor marketed by Digital Equipment Corp. under the designation LSI 11/23.

An output interface 9 is connected with the computer 8. The output interface 9 delivers control pulses to a filter system 10 constituting part of a copying station 11. The copying station 11 is located a certain distance downstream of the measuring system 2. In addition to the filter system 10, the copying station 11 contains a light source 14 and an objective lens 12. The objective lens 12 focuses the image of an original 1a located in the copying station 11 onto a strip 13 of color copying material.

The filter system 10, which is located between the light source 14 and the film 1, comprises three copying filters 10a, 10b, 10c as well as guides and drives for the filters 10a–10c. The drives are conventional and are here in the form of electromagnets 10d, 10e, 10f which respectively move the filters 10a–10c. Each of the filters 10a–10c is designed to terminate exposure of an original 1a in one of the primary colors upon being moved into the path of the light from the light source 14 to the original 1a. The illustrated filter system 10 containing the color filters 10a–10c and the corresponding electromagnets 10d–10f is designed to regulate the amounts of copying light in the different colors by controlling the exposure time in each color. However, the amounts of copying light in the various colors may also be regulated by controlling the intensity of the light. This may be accomplished by moving subtractive color filters into the path of the copying light to a greater or lesser extent so that the required color composition calculated by the computer 8 is achieved. The exposure time is then the same for all of the primary colors and is calcuiated by the computer 8. The exposure may be terminated using a shutter which is equipped with a drive similar to that employed for the filters 10a-10c.

The film 1 of FIG. 1 appears to be of a single type having a predetermined length. In practice, however, a film such as the film 1 is always composed of several individual film strips which are adhesively joined to one another. This is illustrated in FIG. 4 which, as indicated previously, shows 135 size film, i.e. small image or small size film. The film 1 of FIG. 4 is seen to have an adhesive joint 1d which connects two different strips of film. Aside from the edge notches 1c which identify the locations of the originals 1a, the film 1 of FIG. 4 is provided with an arcuate cutout 1e at and on either side of the adhesive joint 1d. The cutouts 1e make it possible to mechanically detect the transition from one film strip to another. The cutouts 1e may be eliminated if an infrared detector rather than a mechanical detector is employed. Thus, as a rule, adhesive strips are opaque to infrared radiation.

Figure 2:
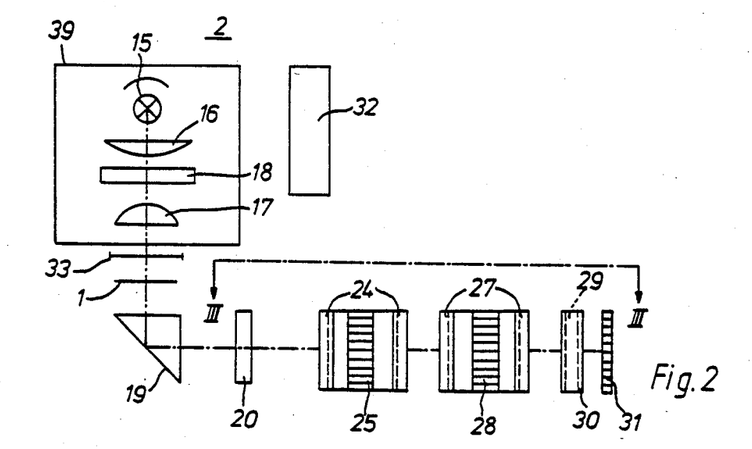
FIG. 2 shows details of a transparency measuring system forming part of the arrangement of FIG. 1.
Figure 3:
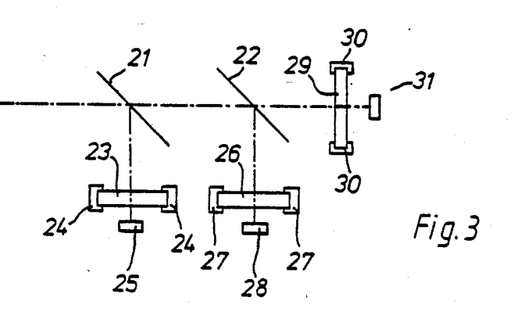
FIG. 3 is a view in the direction of the arrows III—III of FIG. 2.

FIGS. 2 and 3 show details of the transparency measuring system 2 of FIG. 1. The measuring system 2 includes a housing having a section 39 which is located above the path A of the film 1. The housing section 39 accommodates a source 15 of measuring light. The light source 15 is here assumed to be a halogen lamp which emits light having approximately the same spectral distribution as the light generated by the light source or lamp 14 used for copying. The lamp 15 is cooled by a blower 32. A reflector is disposed behind the lamp 15, as considered along the path of travel of the measuring light, while a pair of condensing lenses 16 and 17 are located in front of the lamp 15. A heat shielding filter 18 is arranged between the lenses 16 and 17.

The light beam issuing from the housing section 39 impinges upon a diaphragm 33. The diaphragm 33, which is located above the film 1, is provided with a narrow slit which extends transversely of the film 1. The light impinging upon the film 1 is thus in the form of a narrow band extending across the film 1. The light which passes through the film 1 travels to a deflecting prism 19 which deflects the light through an angle of 90° and to a second heat shielding filter 20. Downstream of the heat shielding filter 20, the light impinges upon a blue light reflector 21 which also operates as a yellow filter. The blue light reflector 21 is inclined at an angle of 45° to the path of travel of the light. The blue light reflector 21 deflects the blue light in the light band through an angle of 90° to a blue filter 23. The blue filter 23 is designed to be interchangeable and is slidably mounted in guides 24. Behind the blue filter 23 is a row 25 of photoreceivers or measuring devices which are sensitized to blue light. The row 25 of blue light photoreceivers is oriented in such a manner that an image of the slit in the diaphragm 33 is formed on the row 25.

Yellow light passes through the blue light reflector 21 and travels to a second partially light-transmissive reflector 22. The reflector 22 deflects the red light through an angle of 90° and to a red filter 26. The red filter 26 is designed to be interchangeable and is slidably mounted in guides 27. Behind the red filter 26 is a row 28 of photoreceivers or measuring devices which are sensitized to red light. Similarly to the row 25 of blue light photoreceivers, the row 28 of red light photoreceivers is oriented in such a manner that an image of the slit in the diaphragm 33 is formed on the row 28.

The green light passes through the partially light-transmissive reflector 22 and travels to a green filter 29. The green filter 29 is again interchangeable and is slidably mounted in guides 30. A row 31 of photoreceivers or measuring devices sensitized to green light is located behind the green filter 29. The row 31 of green light photoreceivers is again oriented such that an image of the slit in the diaphragm 33 is formed on the row 31.

The speed of advance of the film 1 through the measuring system 2 is coordinated with the scanning speed of the photoreceivers. The coordination is such that precisely the required number of signals are transmitted from each region of an original 1a to the transducer 5.

The blue light from the source 15 of measuring light is filtered along its path of travel by a series of filter components including the heat shielding filters 18, 20 and the blue filter 23. The red light is filtered by a series of filter components including the heat shielding filters 18, 20, the partially light-transmissive reflector 21 and the red filter 26. Likewise, the green light is filtered along its path of travel by a series of filter components including the heat shielding filters 18, 20, the partially light-transmissive reflectors 21, 22 and the green filter 29. The transmissivities of the paths followed by the light from the measuring lamp 15 may be calculated as follows:

The copying material 13 registers the density of a region of the film 1 in a primary color i according to the following equation:

$$d_{pi} = - \lg \frac{T(X) \cdot E_{pi}(X) \cdot P_p(X) \cdot T_p(X) \cdot dX}{E_{pi}(X) \cdot P_p(X) \cdot T_p(X) \cdot dX} \quad (1)$$

where
- X represents the wavelength,
- $E_{pi}(X)$ represents the spectral sensitivity or response of the copying material 13 as a function of the wavelength X,
- T(X) represents the transmissivity of the film 1 as a function of the wavelength X,
- $P_p(X)$ represents the spectrum of the copying lamp 14 as a function of the wavelength X,
- $T_p(X)$ represents the overall transmissivity of the optical components between the copying lamp 14 and the copying material 13 as a function of the wavelength X, and
- $d_{pi}$ represents the density of a region of the film 1 in the primary color i as recorded by the copying material 13.

The measuring system 2 registers the density of a region of the film 1 in a primary color i according to the following equation:

$$d_{mi} = - \lg \frac{T(X) \cdot T_i(X) \cdot E_{si}(X) \cdot P_m(X) \cdot dX}{T_i(X) \cdot E_{si}(X) \cdot P_m(X) \cdot dX} \quad (2)$$

where
- $T_i(X)$ represents the overall transmissivity of the filter components between the measuring lamp 15 and the respective measuring devices 25,28,31 as a function of the wavelength X,
- $E_{si}(X)$ represents the spectral sensitivities of the measuring devices 25,28,31 as a function of the wavelength X, $P_m(X)$ represents the spectrum of the measuring lamp 15, and $d_{mi}$ represents the density of a region of the film 1 in the primary color i as registered by a measuring device 25,28,31.

In order for the measuring system 2 to measure an original 1a so accurately relative to the copying material 13 that the latter reproduces the original 1a correctly, it is necessary for the measuring system 2 to register the original 1a in the same manner as the copying material 13. The measuring system 2 registers an original 1a in the same manner as the copying material 13 when the following equality holds true:

$$d_{mi} = d_{pi}. \quad (3)$$

This condition is satisfied when:

$$T_i(X) = \frac{E_{pi}(X) \cdot P_p(X) \cdot T_p(X)}{E_{si}(X) \cdot P_m(X)} \cdot \text{constant} \quad (4)$$

The measuring system 2 has the desired characteristics when, for a given wavelength, the overall transmissivity of the filter components along a respective light path of the measuring system 2 is calculated according to equation (4).

Investigations have shown that relatively strict requirements for curve fitting apply. Differences of only a few nanometers between the theoretical and actual filter curves of transmissivity versus wavelength are acceptable. Somewhat larger differences are acceptable in the short wavelength region than in the long wavelength region. In the long wavelength region, the acceptable differences between the theoretical and actual filter curves are of the order of ±2.5 nanometers while differences of as much as ±5 nanometers can be tolerated in the short wavelength region.

The spectral sensitivity or response of the photoreceivers 25,28,31 depends upon the wavelength. Furthermore, there are differences in the spectral transmissivities of the optical components of the measuring system 2 and the optical components of the copying station 11. Consequently, the theoretical overall transmissivity of the filter components along a light path of the measuring system 2 may differ from the effective spectral sensitivity of the copying material 13.

Figure 5:
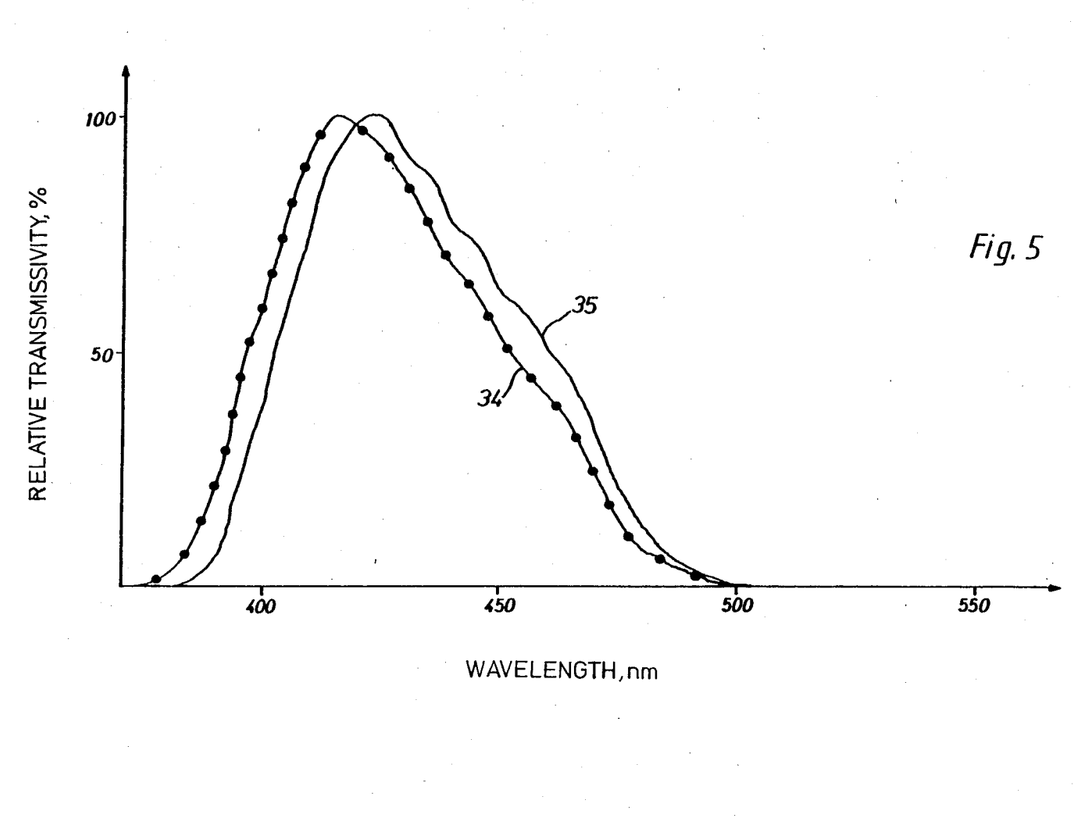
FIG. 5 is a plot of relative transmissivity versus wavelength and compares the transmissivity of a blue filter for the measuring system of FIG. 2 with the spectral sensitivity of a particular copying material.
Figure 6:
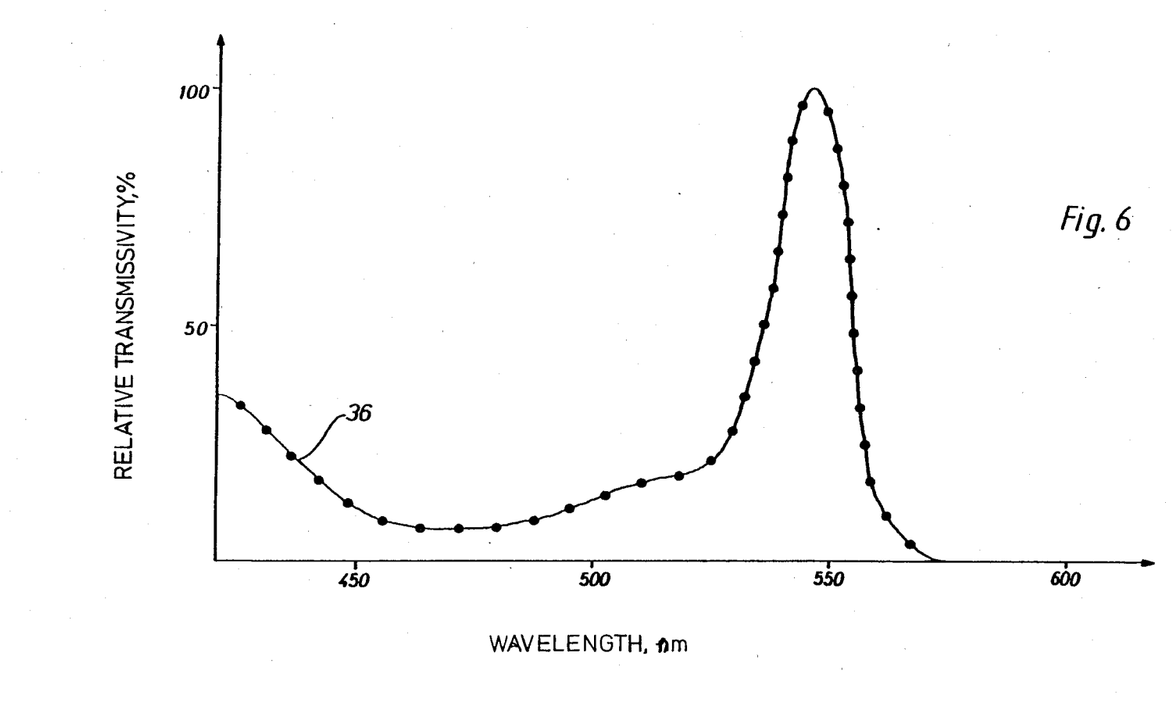
FIG. 6 is similar to FIG. 5 and compares the transmissivity of a green filter for the measuring system of FIG. 2 with the spectral sensitivity of the copying material in green.
Figure 7:
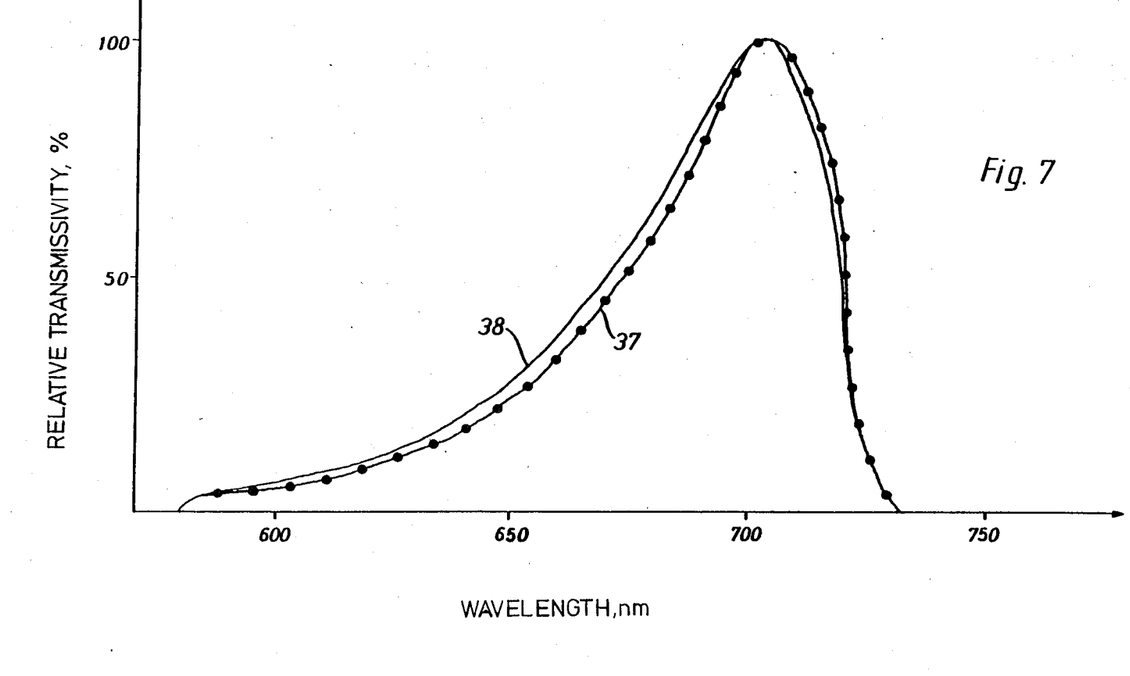
FIG. 7 is similar to FIG. 5 and compares the transmissivity of a red filter for the measuring system of FIG. 2 with the spectral sensitivity of the copying material in red.

FIGS. 5–7 compare the theoretical filter curves for the measuring system 2 in the respective primary colors with the measured sensitivity or response of a copying material. The copying material is here paper no. 589 marketed by Agfa-Gevaert Aktiengesellschaft of Leverkusen, the Federal Republic of Germany.

Referring to FIG. 5, the curve 34 represents the spectral response or sensitivity of copying paper no. 589 to blue light. The required transmissivity $T_i(X)$ of the measuring system 2 for blue light was calculated from the sensitivity curve 34 and is represented by the curve 35 in FIG. 5. The differences between the curves 34 and 35 arise because the spectral sensitivity of the blue light photoreceiver 25 of the measuring system 2 deviates from a constant value. Differences between the measuring lamp 15 and the copying lamp 14 may also contribute to deviation of the curves 34 and 35 from one another.

In FIG. 6, the curve 36 represents the relative spectral sensitivity or response of copying paper no. 589 to green light. The theoretical filter transmissivity curve is virtually superimposed with the curve 36 in the region of interest.

With reference to FIG. 7, the curve 37 represents the spectral sensitivity or response of copying paper no. 589 to red light. The reference numeral 38 identifies the theoretical filter transmissivity curve for red light.

The theoretical filter transmissivity for the measuring system 2 may be achieved using dichroitic reflectors, i.e. partially light-transmissive reflectors produced by vapor deposition of a layer which reflects specific colors, and/or mass filters and/or interference color filters. For the most part, these filters are available commercially. If not readily available, they may be manufactured by vapor depositing thin layers onto glass carriers or supports. The thicknesses of the vapor deposited layers should be of the order of the wavelength of light.

The degree to which the actual filter curves must approximate the theoretical curves depends on the conditions. When that side or flank of a filter curve which is located in the long wavelength region, i.e. the right-hand side or flank in FIGS. 5–7, is steeper than the side or flank in the short wavelength region, the steeper sides of the actual and theoretical curves must approximate one another more closely than the more gently sloping sides. For example, the acceptable deviation of the steeper sides of the actual and theoretical filter curves from one another may be only ±2.5 nanometers while deviations of up to ±5 nanometers may be acceptable for the more gently sloping sides.

The spectral curves of different copying material may differ greatly from one another. Thus, it is necessary to provide a set of filters for each type of copying material to be employed and to change the filters when a change is made in the type of copying material. It is for this reason that the color filters 23,26,29 of the measuring system 2 are removably mounted in the guides 24,27,30. The guides 24,27,30 may be U-shaped so that the color filters 23,26,29 may be simply slid into and out of the guides 24,27,30. This makes it possible to readily change the filters 23,26,29.

The arrangement of FIG. 1 operates as follows:

The film 1 is conveyed in the direction A through the measuring system 2 and the copying station 11. As mentioned previously, the film 1 is made up of a series of adhesively connected, individual film strips. The length of that portion of the path A between the measuring system 2 and the copying station 11 is selected in such a manner that each original 1a of an individual film strip, or at least a section of the film strip which is sufficiently long to be characteristic of the type of film, is scanned by the measuring system 2 before the first original 1a enters the copying station 11. The film 1 may, for example, be conveyed through a looped guide between the measuring system 2 and the copying station 11 should it be necessary to increase the length of that portion of the path A between the measuring system 2 and the copying station 11 so that the leading original 1a of an individual film strip will not enter the copying station 11 until a sufficient length of the film strip has been scanned in the measuring system 2.

The data in the memory 7 relating to an individual film strip are retrieved for control of the copying operation no later than such time as the adhesive joint 1d at the trailing end of the film strip passes through the transparency measuring system 2. This makes the major part of the memory 7 available for storage of the measurements to be obtained from the succeeding film strip which is about to be scanned in the measuring system 2.

As the succeeding film strip enters the measuring system 2, scanning of individual regions of the film strip in each of the primary colors begins. The measuring system 2 measures the transparency of the scanned regions in each of the primary colors. The transparency values are converted to density values by the transducer 5. Since the measuring system 2 is equipped with color filters which cause the spectral sensitivities of the photoreceivers 25,28,31 to approximate or match the spectral sensitivities of the copying material 13 in the corresponding colors, i.e. since the measuring system 2 is equipped with color filters which yield transmissivity curves approximating or matching the spectral sensitivity curves of the copying material 13 in the respective colors, the density values derived from the measuring system 2 in each color accurately reflect the degree to which light in the respective color will darken the copying material 13. For example, when copying paper no. 589 of Agfa-Gevaert Aktiengesellschaft is employed, the measuring system 2 is equipped with color filters which yield the transmissivity curves of FIGS. 5-7.

The density values obtained from a section of the film strip which is representative of the entire strip are transferred into the memory 7 via the input interface 6. The computer 8 withdraws the density values from the memory 7 and begins to calculate a set of data characteristic of this section of the film strip once a predetermined number of density values have been accumulated. Such a set of data may, for instance, comprise a set of curves representing differences in color density. Curves of this type are disclosed in the West German Offenlegungsschrift No. 29 12 130. It is particularly advantageous for the set of data to include a plot of difference in red density and green density as a function of gray density as well as a plot of difference in blue density and green density as a function of gray density.

For each region, the respective density differences are compared with the appropriate curves of density difference. Based on the deviation of the density differences for the respective region from the corresponding curves, a decision is made as to whether this region has a normal color composition or exhibits a color dominant. The density values for all those regions of a given original 1a which do not contain a color dominant, that is, which have an at least approximately neutral color composition, are summed. Thereafter, the amounts of copying light in the three primary colors are calculated so as to produce copies of these regions having a neutral color composition and an average density. The calculated amounts of copying light for the respective original 1a are now stored. The calculated amounts of copying light are advanced through storage in synchronism with advance of the film 1 along the path A until the corresponding original 1a enters the copying station 11. The advance of the calculated amounts of copying light through storage may, for example, be coordinated with advance of the film 1 along the path A via the length detector 3. Once the respective original 1a has entered the copying station 11, the output interface 9 uses the corresponding calculated amounts of copying light to operate the electromagnets 10d-10f. The electromagnets 10d-10f, in turn, move the filters 10a-10c so that the exposure of the original 1a in each primary color corresponds to the calculated amount of copying light in the respective color.

When the adhesive joint 1d at the trailing end of the film strip being processed enters the copying station 11, the characteristic set of data for the film strip, as well as the density values and calculated amounts of copying light for the respective originals 1a of the film strip, may be erased from the memory 7. This ensures that the memory 7 always has sufficient capacity for new data.

An alternative procedure for distinguishing between color dominants and color tones is disclosed in the commonly-owned U.S. patent application Ser. No. 610,399 of Manfred Fursich et al. filed May 15, 1984 and entitled Color Copying Machine. Here, the characteristic set of data for a film strip is assembled using as a reference point that region of the film strip having the greatest transparency. This region is assumed to have been located adjacent to the mask used in producing the film strip. Based on the region of greatest transparency, each region of an original is investigated in order to establish whether or not it contains a color dominant. The amount of copying light in each of the primary colors is then calculated based upon those regions which are free of color dominants.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of copying colored originals constituting part of the same photosensitive article, particularly for use in copying frames of the same strip of color film, said method comprising the steps of:
   (a) measuring the transparency of said article in each of the primary colors at a multiplicity of regions characteristics of the portion of said article having said originals, each of said originals containing at least some of said regions, and the measuring step being performed by directing measuring light in each primary color along a respective measuring path to a measuring device for the color, said measuring light being derived from a first light source;
   (b) processing the measurements generated during the measuring step to obtain a set of data characteristic of said portion of said article and indicative of the color compositions of said regions;
   (c) calculating the amount of copying light required in each primary color to achieve at least approximately neutral gray copies of those regions of each original having an at least approximately neutral gray color composition, the calculating step being performed using said set and the measurements for the respective originals; and
   (d) copying said originals onto copying material using the amounts of copying light derived from the calculating step, said copying light being derived from a second light source and being directed along a copying path separate from said measuring paths, and the measuring step including filtering the measuring light in each primary color upstream of the corresponding measuring device to thereby adjust the spectral sensitivity of each measuring device so as to at least approximate the spectral sensitivity of said copying material in the respective color, said filtering comprising developing theoretical filtering curves of transmissivity versus wavelength designed to equalize the spectral sensitivities of said measuring devices and the corresponding spectral sensitivities of said copying material taking into account differences in the spectra of said light sources, and spectral differences between the transmissivities of said copying path and transmissivities of said measuring paths.

2. The method of claim 1, wherein the filtering in at least one primary color is performed using a combination of a mass filter and an interference filter.

3. The method of claim 1, wherein the filtering in at least one primary color is performed using a combination of a mass filter and a partially light-transmissive reflector.

4. The method of claim 1, wherein the filtering in at least one primary color is performed using a combination of an interference filter and a partially light-transmissive reflector.

5. The method of claim 1, wherein the filtering in at least one primary color is performed using a combination of a mass filter, an interference filter and a partially light-transmissive reflector.

6. The method of claim 1, wherein said filtering is performed using actual filtering curves of transmissivity versus wavelength which deviate from the respective theoretical filtering curves by at most ±2.5 nanometers in the long wavelength region.

7. The method of claim 6, wherein said actual filtering curves deviate from the respective theoretical filtering curves by at most ±5.0 nanometers in the short wavelength region.

8. An arrangement for copying colored originals constituting part of the same photosensitive article, particularly for copying frames of the same strip of color film, said arrangement comprising:

(a) measuring means for measuring the transparency of the photosensitive article in each of the primary colors at a multiplicity of regions characteristic of the portion of the article having the originals, said measuring means including at least one measuring device for each color designed to generate measurements of the transparency in the respective color, and said measuring means further including a first optical system for directing light to said measuring devices, said first optical system having a first light source;

(b) processing means arranged to receive the measurements and to generate a set of data characteristic of the aforesaid portion of the article and indicative of the color compositions of the measured regions, said processing means also being designed to operate on the measurements and the set of data so as to derive the amount of copying light required in each primary color to achieve at least approximately neutral gray copies of those regions of each original having an at least approximately neutral gray color composition; and (c) copying means responsive to said processing means and designed to copy the originals onto copying material using the amounts of copying light calculated by said processing means, said copying means including a second optical system for directing light to said copying material, and said second optical system having a second light source, said first optical system including filter means for each of said measuring devices, and said filter means having respective theoretical first filtering curves of transmissivity versus wavelength designed to equalize the spectral sensitivities of said measuring devices and the corresponding spectral sensitivities of said copying material taking into account differences in the spectra of said light sources and spectral differences in the transmissivities of said optical systems, each of said filter means also having an actual second curve of transmissivity versus wavelength which approximates or is superimposed upon the corresponding first filtering curve to thereby adjust the spectral sensitivity of the respective measuring device so as to at least approximate the spectral sensitivity of said copying material in the corresponding color, and each of said filter means comprising at least one interchangeable filter.

9. The arrangement of claim 8, wherein at least one of said filter means comprises a combination of a mass filter and an interference filter.

10. The arrangement of claim 8, wherein at least one of said filter means comprises a combination of a mass filter and a partially light-transmissive reflector.

11. The arrangement of claim 8, wherein at least one of said filter means comprises a combination of an interference filter and a partially light-transmissive reflector.

12. The arrangement of claim 8, wherein at least one of said filter means comprises a combination of a mass filter, an interference filter and a partially light-transmissive reflector.

13. The arrangement of claim 8, wherein, each of said actual filtering curves deviates from the corresponding theoretical filtering curve by at most ±2.5 nanometers in the long wavelength region.

14. The arrangement of claim 13, wherein said actual filtering curves deviate from the respective theoretical filtering curves by at most ±5.0 nanometers in the short wavelength region.

15. The arrangement of claim 8 comprising guide means for slidably receiving said filters.

16. A method of copying colored originals constituting part of the same photosensitive article, particularly for use in copying frames of the same strip of color film, said method comprising the steps of:

(a) measuring the transparency of said article in each of the primary colors at a multiplicity of regions characteristic of the portion of said article having said originals, each of said originals containing at least some of said regions, and the measuring step being performed by directing measuring light in each primary color along a respective measuring path to a measuring device for the color, said measuring light being derived from a first light source;

(b) processing the measurements generated during the measuring step to obtain a set of data characteristic of said portion of said article and indicative of the color compositions of said regions;

(c) calculating the amount of copying light required in each primary color to achieve at least approximately neutral gray copies of those regions of each original having an at least approximately neutral gray color composition, the calculating step being performed using said set and the measurement for the respective originals; and (d) copying said originals onto copying material using the amounts of copying light derived from the calculating step, said copying light being derived from a second light source and being directed along a copying path separate from said measuring paths, and the measuring step including filtering the measuring light in each primary color upstream of the corresponding measuring device to thereby adjust the spectral sensitivity of each measuring device so as to at least approximate the spectral sensitivity of said copying material in the respective color, said filtering being performed taking into account differences in the spectra of said light sources, and spectral differences between the transmissivities of said copying path and the transmissivities of said measuring paths, and said filtering being carried out substantially in accordance with the following equation:

$$T_i(X) = \frac{E_{pi}(X) \cdot P_p(X) \cdot T_p(X)}{E_{si}(X) \cdot P_m(X)} \cdot \text{constant}$$

where
X represents the wavelength,
$T_i(X)$ represents the transmissivities of said measuring paths,
$E_{pi}(X)$ represents the spectral sensitivity of said copying material,
$P_p(X)$ represents the spectrum of said second light source,
$T_p(X)$ represents the transmissivity of said copying path,
$E_{si}(X)$ represents the spectral sensitivities of said measuring devices, and
$P_m(X)$ represents the spectrum of said first light source.

17. An arrangement for copying colored originals constituting part of the same photosensitive article, particularly for copying frames of the same strip of color film, said arrangement comprising:
  (a) measuring means for measuring the transparency of the photosensitive article in each of the primary colors at a multiplicity of regions characteristic of the portion of the article having the originals, said measuring means including at least one measuring device for each color designed to generate measurements of the transparency in the respective color, and said measuring means further including a first optical system for directing light to said measuring devices, said first optical system having a first light source;
  (b) processing means arranged to receive the measurements and to generate a set of data characteristic of the aforesaid portion of the article and indicative of the color compositions of the measured regions, said processing means also being designed to operate on the measurements and the set of data so as to derive the amount of copying light required in each primary color to achieve at least approximately neutral gray copies of those regions of each original having an at least approximately neutral gray color composition; and
  (c) copying means responsive to said processing means and designed to copy the originals onto copying material using the amounts of copying light calculated by said processing means, said copying means including a second optical system for directing light to said copying material, and said second optical system having a second light source, said first optical system including filter means for each of said measuring devices designed to adjust the spectral sensitivity of the respective measuring device so as to at least approximate the spectral sensitivity of said copying material in the corresponding color, and the transmissivities of said filter means taking into account spectral differences in the transmissivities of said optical systems and differences in the spectra of said light sources, the transmissivities of said filter means substantially satisfying the following equation:

$$T_i(X) = \frac{E_{pi}(X) \cdot P_p(X) \cdot T_p(X)}{E_{si}(X) \cdot P_m(X)} \cdot \text{constant}$$

where
X represents the wavelength,
$T_i(X)$ represents the transmissivity of said first optical system,
$E_{pi}(X)$ represents the spectral sensitivity of said copying material,
$P_p(X)$ represents the spectrum of said second light source,
$T_p(X)$ represents the transmissivity of said second optical system,
$E_{si}(X)$ represents the spectral sensitivities of said measuring devices, and
$P_m(X)$ represents the spectrum of said first light source.

* * * * *